(12) United States Patent
Degler

(10) Patent No.: US 8,512,153 B2
(45) Date of Patent: Aug. 20, 2013

(54) TORSIONAL VIBRATION DAMPER

(75) Inventor: Mario Degler, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 68 days.

(21) Appl. No.: 13/088,604

(22) Filed: Apr. 18, 2011

(65) Prior Publication Data

US 2011/0263340 A1    Oct. 27, 2011

(30) Foreign Application Priority Data

Apr. 22, 2010  (DE) .......................... 10 2010 018 076

(51) Int. Cl.
*F16D 3/12*    (2006.01)

(52) U.S. Cl.
USPC ........................................ 464/64.1; 464/67.1

(58) Field of Classification Search
USPC ................................ 464/64.1, 67.1; 192/3.29
See application file for complete search history.

(56) References Cited

U.S. PATENT DOCUMENTS

| 4,304,107 A | * | 12/1981 | Fall et al. ..................... 464/64.1 |
| 4,580,672 A | * | 4/1986 | Caray ...................... 464/64.1 X |
| 5,964,328 A | | 10/1999 | Fallu et al. |

* cited by examiner

*Primary Examiner* — Gregory Binda
(74) *Attorney, Agent, or Firm* — Simpson & Simpson, PLLC

(57) ABSTRACT

A torsional vibration damper with a damper component and a damper flange part limitedly rotatable within a circumferential clearance with respect to the damper component contrary to the effect of energy accumulator elements. The damper component is formed as a guide shell radially outside and surrounds the radial outmost circumferential section of the energy accumulator elements. The damper flange part comprises circumferentially disposed compression elements. The energy accumulator elements are circumferentially arranged in-between the compression elements. Cutouts formed in the guide shell and the compression elements engage radially into the cutouts whilst facilitating circumferential clearance.

5 Claims, 2 Drawing Sheets

TORSIONAL VIBRATION DAMPER

CROSS-REFERENCE TO RELATED APPLICATIONS

This application claims priority from German Patent Application No. 10 2010 018 076.9, filed Apr. 22, 2010, which application is incorporated herein by reference in their entireties.

FIELD OF THE INVENTION

The invention relates to a torsional vibration damper.

BACKGROUND OF THE INVENTION

U.S. Pat. No. 5,964,328 A discloses a torsional vibration damper disposed within a hydrodynamic torque converter housing. The torsional vibration damper comprises a damper component and a damper flange part that, with respect to the damper component, is rotatable within circumferential clearance contrary to the effect of energy accumulator elements, for example, coil springs. The damper flange part is formed radially outside as a guide shell that surrounds the radially outmost circumferential section of the energy accumulator elements, and thus secures it against movement towards the outside. The damper flange part receives the energy accumulator elements, circumferentially between the compression elements, formed by the damper flange part, which compress the energy accumulator elements. In addition, the compression elements comprise a compression section extending essentially axially, which transforms via a curvature into a main section extending essentially radially—plate-like—on which frictional surfaces of a lockup clutch are disposed, which can be brought into frictional engagement with the housing of the hydrodynamic torque converter.

The centrifugal forces occurring through rotation of the torsional vibration damper and deflection of the coil spring, cause an action of force on the guide shell, which can impair the damping effect through intensified occurrence of friction between the coil spring and the guide shell.

BRIEF SUMMARY OF THE INVENTION

An object of the invention is a torsional vibration damper with an improved damping effect.

A torsional vibration damper with a damper component, and a damper flange part that is rotatable within a circumferential clearance and contrary to the effect of energy accumulator elements, with respect to the damper component, is accordingly disclosed. The damper component is formed radially outside as a guide shell, and surrounds the radially extreme circumferential section of the energy accumulator elements. The damper flange part on the circumferential side and the energy accumulator elements on the circumferential side feature a distance between them and include compressible compression elements. Cutouts are formed in the guide shell and the compression elements, under facilitation of the circumferential clearance, engage radially into the cutouts. The cutouts are particularly at an outmost radial section of the guide shell circumference, where the energy accumulator elements are most strongly pressed on the guide shell by the centrifugal force. Reduction of friction between the energy accumulator elements and the guide shell is implemented and hence an improved damper performance is enabled.

The torsional vibration damper can be formed as a dual mass flywheel. The torsional vibration damper also can be in a hydrodynamic torque converter or in a dry-running or wet-running clutch device.

In one embodiment of the invention, a compression element has a guide element radially outside and radially supports a first adjacent energy accumulator element as well as a first guide element extending segmentally over this guide element on the circumferential side. The guide element engages into the cutout of the guide shell. The guide means is advantageously formed such that the energy accumulator element can be held in place there. In addition, the guide element can be additionally expanded by a bowl with a cone and/or taper.

The compression element has a second guide element advantageously formed such that the adjacent second energy accumulator element stretches segmentally over the circumferential side and radially outside. The first and the second guide elements can have the same or different shapes.

In one embodiment of the invention, an inner circumferential surface of the guide shell surrounding the outmost circumferential section of the energy accumulator elements has a circumferentially variable distance with respect to a rotation axis. Thereby, defined cambers can be provided in the guide shell to obtain locally pronounced friction spots between the guide shell and the energy accumulator element. For instance, the variable distance can be obtained through embossing, forming, corrugation, chamfering and/or through machining the guide shell.

In one embodiment of the invention, the circumferential clearance is restricted through stops disposed to act between the damper component and the damper flange part. The stops between the compression elements and the cutouts are advantageously active and/or are formed by engagement elements and complementary cutouts disposed on the other component on a component comprising a damper part and damper flange part. For instance, the stops can be formed by rivet- or bolt elements fixed on a component, which engage or penetrate through by cutouts in the other component.

In one embodiment of the invention, the damper component is formed as an input damper part for the transmission of torque through the action of the energy accumulator elements on the damper flange part formed as output damper part or as intermediate damper part. The damper component can also be formed as an intermediate damper part or as a damper output part and the damper flange part as an input damper part. In one embodiment of the invention, under the intermediate damper part, a component of the torsional vibration damper is connected actively with two further components via at least two damper stages with respectively inherent energy accumulator elements, so that the torsional vibration damper is formed as a serially connected damper.

Further advantages and advantageous embodiments of the invention are derived from the description and the figures that follow. All illustrated features are not only applicable in the provided combination, but also in other combinations and/or exceptionally, without departing from the teaching of the invention.

BRIEF DESCRIPTION OF THE SEVERAL VIEWS OF THE DRAWING

The invention is described in detail in the following passage with reference to the following figures.

DETAILED DESCRIPTION OF THE INVENTION

Figure 1:
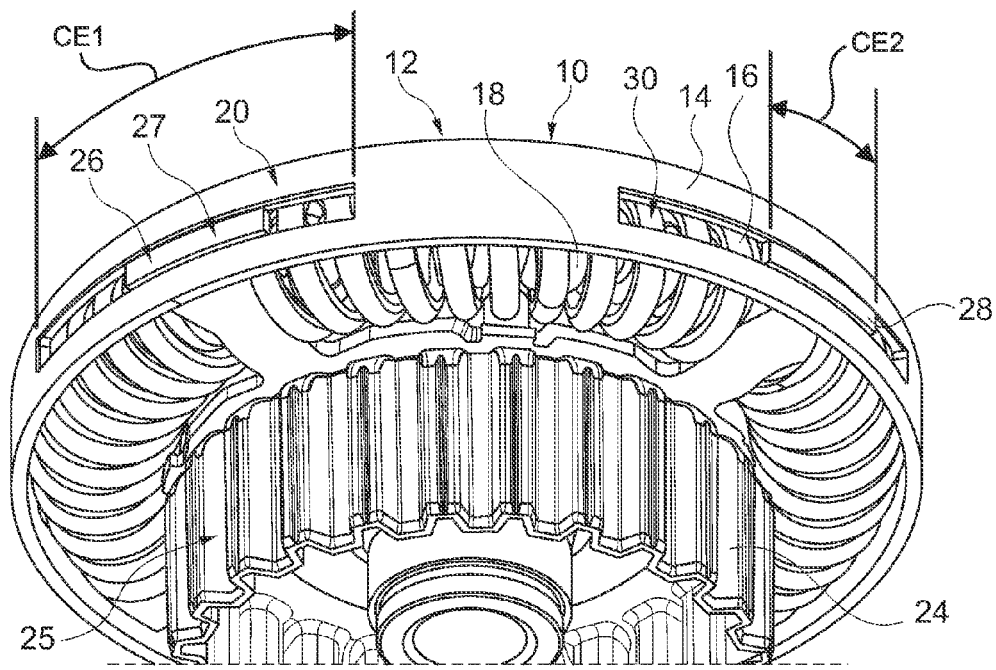
FIG. 1: Perspective view of a torsional vibration damper in one embodiment of the invention, with a damper part plate removed.
Figure 2:
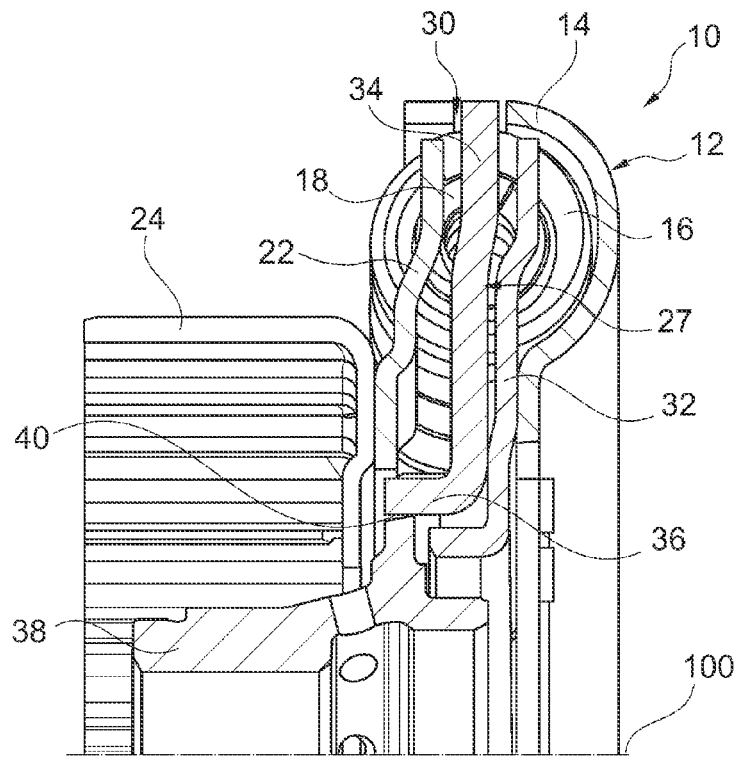
FIG. 2: Partial cross-sectional view, generally along line 2-2 in FIG. 1, of the torsional vibration damper of FIG. 1 with the damper part plate in place.

FIG. 1 is a perspective view of torsional vibration damper 10 in one embodiment of the invention, with damper part plate 22 removed. FIG. 2 is a partial cross-sectional view, generally along line 2-2 in FIG. 1, of torsional vibration damper 10 in FIG. 1. In FIG. 1, damper part plate 22, shown in FIG. 2, has been removed in order to more clearly show damper flange part 27, which would otherwise be at least partially obscured by damper part plate 22. The torsional vibration damper 10, has a damper component 12 formed as a guide shell 14 in a radial external section.

Radially within the guide shell 14, two energy accumulator elements 16, 18 acting in parallel are nested in each other disposed in the form of coil springs, by which the radial outmost circumferential section is surrounded by the guide shell 14, so that the energy accumulator elements 16 of the guide shell 14 are fixed with respect to radial outward movement. The guide shell 14 thereby surrounds the radial extension of the energy accumulator elements 16 on at least one axial side and transforms into a plate-like section radially further inwards.

The damper component 12 formed as an input damper part 20 is connected non-rotatably with damper plate part 22 which is again connected non-rotatably with a plate carrier 24 of a clutch device. The plate carrier 24 is formed as an inner plate carrier, and it receives friction plates of the clutch device such that the friction plates can be driven axially movably and non-rotatably by means of the teeth system 25 on the plate carrier 24. Torque is transmitted by the clutch device via the friction plates on the plate carrier 24 further to the damper plate part 22. The damper plate part 22 is interrupted on the circumferential side and accommodates the energy accumulator elements 16 in these interstices. At the same time, the energy accumulator elements 16 can be compressed by the damper plate part 22 in both directions. The torque introduced into the energy accumulator elements 16 is transmitted by this to the damper flange part 27 disposed axially next to the damper plate part 22 and formed as an output damper part 26, which has compression elements 28 corresponding to the latter. An energy accumulator element 16 is therefore fixed or received respectively circumferentially between a circumferential side of the damper plate part 22 and an opposite circumferential side of the compression elements 28 so that upon introduction to one of these components over the effect of the energy accumulator elements 16, 18 the torque is transferable to the other component.

The compression elements 28 of the damper flange part 27 extend essentially in radial direction and thereby engage in cutouts 30 formed on the guide shell 14 whilst facilitating the circumferential clearance of mutually limitedly rotatable damper component 12 and damper flange parts 27. The cutouts in the damper component 12 and/or in the guide shell 14 cause reduced friction of the energy accumulator element 16 at an internal circumferential section of the guide shell 14, and therewith an improved damping effect of the torsional vibration damper 10. Circumferential extent CE1 of cutouts 30 is greater than circumferential extent CE2 of compression elements 28.

Radially within the energy accumulator elements 16, 18 that are nested in each other and act in parallel, the damper component 12 is connected non-rotatably over fasteners, for example rivet elements, with a second damper plate part 32 that is again connected non-rotatably with damper plate part 22, and is disposed axially spaced from the latter, and on which a plate carrier 24 of a clutch device is fixed. Axially between damper plate parts 22 and 32, a damper flange part 27 is disposed, which for the compression of the energy accumulator elements 16, 18 comprises integrally shaped compression elements 34, which engage through cutouts 30 of the guide shell 14 formed integrally from the damper component 12. The damper plate parts 22, 32 comprise a defined radial distance from the guide shell 14, so that a rotation of these components against each other about the common axis of rotation 100 is enabled. The damper flange part 27 is bent in a radial internal section for the formation of axially extending section 36 and is fixed on a damper hub 38 by means of a form-closed connection 40.

Figure 3:
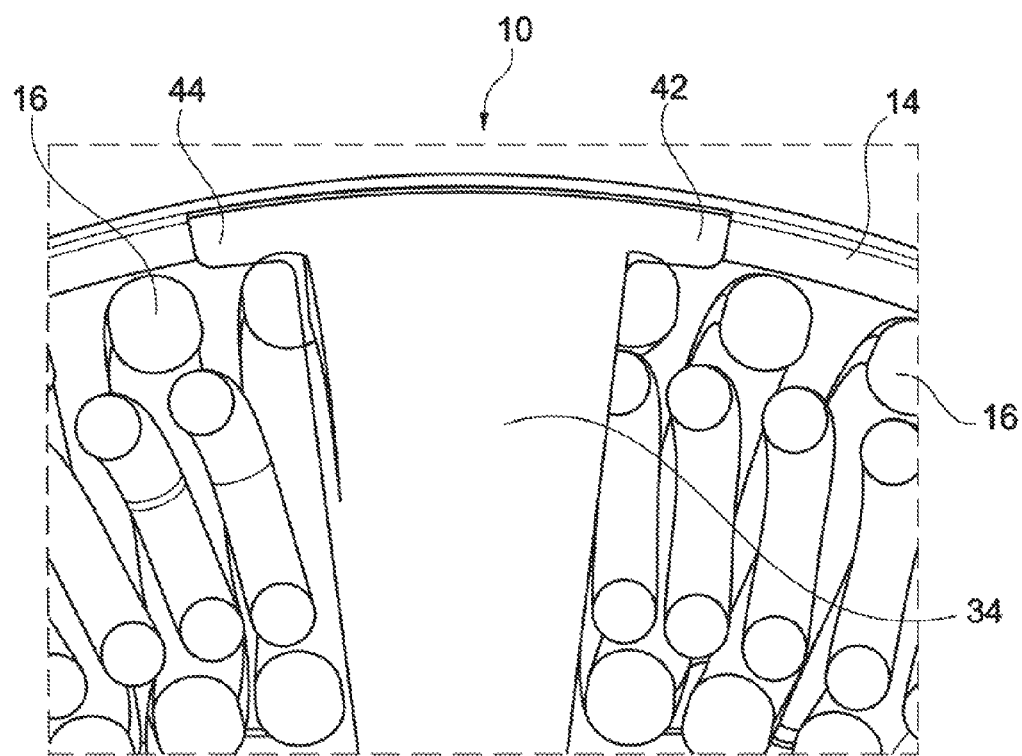
FIG. 3: Front view of a section of a torsional vibration damper in one embodiment of the invention.

In FIG. 3, a section is shown in front view of a torsional vibration damper 10 in one embodiment of the invention. The compression element 34 has a guide element 42 radially outside and for radial support of an adjacent energy accumulator element 16, which segmentally stretches over the energy accumulator element 16 on the circumferential side and engages into a cutout of the guide shell 14. Thus, a further radial lock of energy accumulator element 16 and further reduction of the friction between the energy accumulator element 16 and the guide shell 14 is enabled. On the side of the compression elements 34 opposite the circumferential side, element 34 forms a second guide element 44 that segmentally stretches over the adjacent energy accumulator element 16 on the circumferential side and radially outside. In one embodiment, guide elements 42, 44 feature the same shape.

List Of Reference Symbols 10 torsional vibration damper
12 damper component
14 guide shell
16 energy accumulator element
18 energy accumulator element
20 input damper part
22 damper plate part
24 plate carrier
25 teeth system
26 output damper part
27 damper flange part
28 compression element
30 cutout
32 damper plate part
34 compression element
36 section
38 damper hub
40 connection
42 guide element
44 guide element
100 axis of rotation

What I claim is:
1. A torsional vibration damper, comprising:
a damper component formed as a guide shell;
energy accumulator elements;
a damper hub; and,
a damper flange part:
fixed on the damper hub at a point radially inward of the energy accumulator elements;

limitedly rotatable within a circumferential clearance with respect to the damper component contrary to the effect of the energy accumulator elements; and including circumferentially disposed compression elements, wherein:

the guide shell surrounds respective radial outmost circumferential sections of the energy accumulator elements;

the energy accumulator elements are circumferentially arranged between the plurality of compression elements;

the compression elements are radially disposed into respective cutouts formed in the guide shell; and, respective circumferential extents of the respective cutouts are greater than respective circumferential extents of portions of the compression elements disposed in the respective cutouts.

2. The torsional vibration damper according to claim 1, wherein a compression element includes a first guide element formed on a radially outward portion of the compression element, the first guide element radially supporting a first adjacent energy accumulator element and over-stretching the first adjacent energy accumulator element on a circumferential side, the first adjacent energy accumulator element engaging the first guide element in a respective cutout.

3. The torsional vibration damper according to claim 2, wherein the compression element forms a second guide element that stretches over a second adjacent energy accumulator element on a circumferential side and radially outside.

4. The torsional vibration damper according to claim 3, wherein the first guide element and the second guide element are similar in shape.

5. The torsional vibration damper according to claim 1, wherein the damper component is formed as an input damper part for the transmission of torque through the action of the energy accumulator elements on the damper flange part formed as an output damper part or an intermediate damper part.

\* \* \* \* \*